United States Patent

Moore

[11] Patent Number: 5,494,084
[45] Date of Patent: Feb. 27, 1996

[54] INERT GAS FILL NOZZLE AND PRESSURE RELIEF VALVE

[75] Inventor: William F. Moore, Catlettsburg, Ky.

[73] Assignee: Ashland Inc., Ashland, Ky.

[21] Appl. No.: 267,072

[22] Filed: Jun. 27, 1994

[51] Int. Cl.$^6$ ..................... F16K 24/00
[52] U.S. Cl. ............ 141/46; 141/63; 141/197; 141/310; 137/588; 137/590.5
[58] Field of Search ................... 141/4, 46, 63, 141/95, 96, 197, 286, 289, 310, 363, 365, 367, 368, 382; 137/587, 588, 590.5, 592; 220/86.1, 86.2, 745, 746

[56] References Cited

U.S. PATENT DOCUMENTS

| | | |
|---|---|---|
| 1,589,500 | 6/1926 | Wilcox . |
| 2,347,193 | 4/1944 | Hammand ................ 141/96 X |
| 2,466,076 | 4/1949 | Bentley et al. ............. 220/86 |
| 2,602,465 | 7/1952 | Goehring ............. 137/592 X |
| 2,811,179 | 10/1957 | Greenwood ................ 141/95 |
| 2,956,737 | 10/1960 | Hager ................ 141/367 X |
| 3,334,667 | 8/1967 | Hedstrom ................ 141/46 |
| 3,385,327 | 5/1968 | Granier ................ 141/46 X |
| 3,415,273 | 12/1968 | Elbogen ............. 137/587 X |
| 3,680,606 | 8/1972 | Ensign ................ 141/128 |
| 3,814,147 | 6/1974 | Lindberg ............. 141/368 X |
| 3,865,270 | 2/1975 | Petersson ............. 220/85 B |
| 5,127,118 | 7/1992 | Johenning ............. 5/451 |
| 5,209,456 | 5/1993 | Chronister ............. 141/368 X |
| 5,232,028 | 8/1993 | Sunderhaus et al. ............. 141/301 |
| 5,312,545 | 5/1994 | Starin et al. ............. 210/172 |

FOREIGN PATENT DOCUMENTS 0169896  3/1935  Switzerland ............. 137/587

OTHER PUBLICATIONS

"Tite–Fill System", Industrial & Petroleum Equipment.

Primary Examiner—J. Casimer Jacyna
Attorney, Agent, or Firm—Richard C. Willson, Jr.; Donald E. Zinn

[57] ABSTRACT

A thin elongated metal tube of a diameter less than the diameter of a inlet aperture within the top of a fuel tank and opening upwardly therefrom has a closed lower end inserted within the aperture. The metal tube is supported by a radially enlarged collar on the periphery of the metal tube intermediate of its ends, having a diameter in excess of the diameter of the fuel inlet aperture. Purge gas distribution openings are provided within the lower opposite end of the metal tube to distribute purge gas interiorly of the fuel storage tank. The weight of the distribution nozzle is set to balance axially upward lift forces developed during inert gas pressurization of the tank to prevent overpressurization and rupture of the tank when the gas pressurization of the tank reaches a predetermined level less than that causing rupture of the tank. Purge gas created forces acts on the thin elongated metal tube and the collar to raise the collar off of the aperture sufficiently to axially unseat the collar from the inlet aperture.

6 Claims, 2 Drawing Sheets

INERT GAS FILL NOZZLE AND PRESSURE RELIEF VALVE

FIELD OF THE INVENTION

This invention relates to a nitrogen or other inert gas distribution nozzle for insertion within a fuel inlet aperture of a tractor trailer fuel transport tank, and more particularly to a nitrogen distribution nozzle functioning as a pressure relief valve for the prevention of overpressurizing of such fuel transport tanks formed of lightweight metal such as aluminum.

BACKGROUND OF THE INVENTION

Tractor trailer fuel transport tanks and fuel storage tanks in general employ pressure relief valves for preventing overpressurization of the tank, particularly when employing an inert gas under light pressure to purge oxygen from an empty tank and prior to filling of the same with a liquid hydrocarbon fuel. The presence of significant oxygen content within the tanks at the time of filling of the tank with the liquid hydrocarbon fuels significantly increases the possibility of an explosion occurring, particularly where, due to the chemical makeup of the fuel or other combustible liquid being carried by the tank, there is a buildup of static electricity capable of igniting the fuel or like liquid during filling of same. Typical trailer fuel transport tanks formed of stainless steel plate are rated for 25 psi. In contrast, the aluminum trailers which have come into vogue such as those referred to as MC306 carry a rating of 3 psi. While the aluminum trailer tanks carry the liquid hydrocarbon at atmospheric pressure, in order to purge the aluminum trailer tanks with an inert gas such as nitrogen, to reduce oxygen content substantially below 9%, with below 7% being preferred and below 5% being most preferred (all contents by volume), with the oxygen escaping the interior of the aluminum trailer tanks via one or more vapor recovery units within the tank wall, there is a high potential for potential damage to the trailer should the tank become pressurized. Whether such trailer transport tanks are of stainless steel or aluminum, the tanks carry pressure relief valves to prevent overpressurization. While most trailers are equipped with a vapor recovery system which includes means for relieving the pressure and preventing overpressurization of the trailer transport tank, such pressure relief vapor recovery system often fails. Where the trailer transport tank or the like is formed of aluminum, it imperative that while purging of the tank with an inert gas such as nitrogen, the tank pressure be relieved at 1.5 psi or near that value.

Therefore, it is a primary object of this invention to provide a nitrogen distribution nozzle for effectively diffusing the nitrogen gas under pressure throughout an aluminum trailer transport tank or the like, which performs a pressure relief function as low as 1.5 psi, which is of simplified structure, which is projected within a tank inlet aperture and gravity maintained therein; and which is physically raised under gas pressurization of the tank during nitrogen purging to prevent overpressurization of the tank during purging to self pressure relieve, which is of low cost and which is highly reliable.

SUMMARY OF THE INVENTION

In general, the combined nitrogen distribution nozzle and pressure relief valve of the invention for limiting purging gas pressurization of a trailer fuel transport tank or the like provided with an upwardly opening fuel inlet aperture is comprised of a thin elongated metal tube of a diameter less than the diameter of the aperture. The metal tube has an open first end for coupling to a source of inert purge gas. A closed second end of the tube is projectable within the tank aperture. A sealing means is carried by the tube proximate to the first end and overlying the aperture for sealing off the tube aperture when the tube is gravity mounted to the tank with the closed second end projecting internally of the tank. The weight of the tube is correlated to the surface area of the sealing means carried by the tube and the closed end of the tube, such that inert gas pressurization of the tank during purging by the inert gas is prevented by the purge gas raising the tube sealing means off the aperture to the extent of reducing the purging gas pressurization of the tank.

The sealing means may comprise an annular collar carried by the tube on the outer periphery thereof, which is of a diameter in excess of the diameter of the aperture. Preferably, a rubber sealing gasket is mounted on the surface of the collar facing the aperture. Preferably, the closed second end of the tube carries a plurality of circumferentially spaced elongated slots within the tube from the closed end of the tube in the direction of the open first end thereof. An inverted U-shaped handle is preferably fixed to the surface of the collar opposite the sealing gasket, which U-shaped handle extends obliquely outwardly of the collar in a direction towards the first open end of the tube for facilitating manual insertion and removal of the tube second end through the filling aperture of the tank. The thin elongated metal tube, collar and handle may be formed of stainless steel. The collar may be formed by an apertured metal disk welded about the periphery of the aperture to the outer periphery of the thin elongated metal tube.

The weighted nitrogen distribution nozzle and pressure relief device may be connected at said first open end to a source of an inert gas such as nitrogen, pressurized on the order of 17 psig, and the nozzle openings sized such that the flow of nitrogen is approximately 600 standard cubic feet per minute (SCFM), with the weighted nitrogen distribution nozzle device weighing approximately 11 pounds maximum pressure within the aluminum tank to 1.5 psig.

DESCRIPTION OF THE PREFERRED EMBODIMENT

Figure 1:
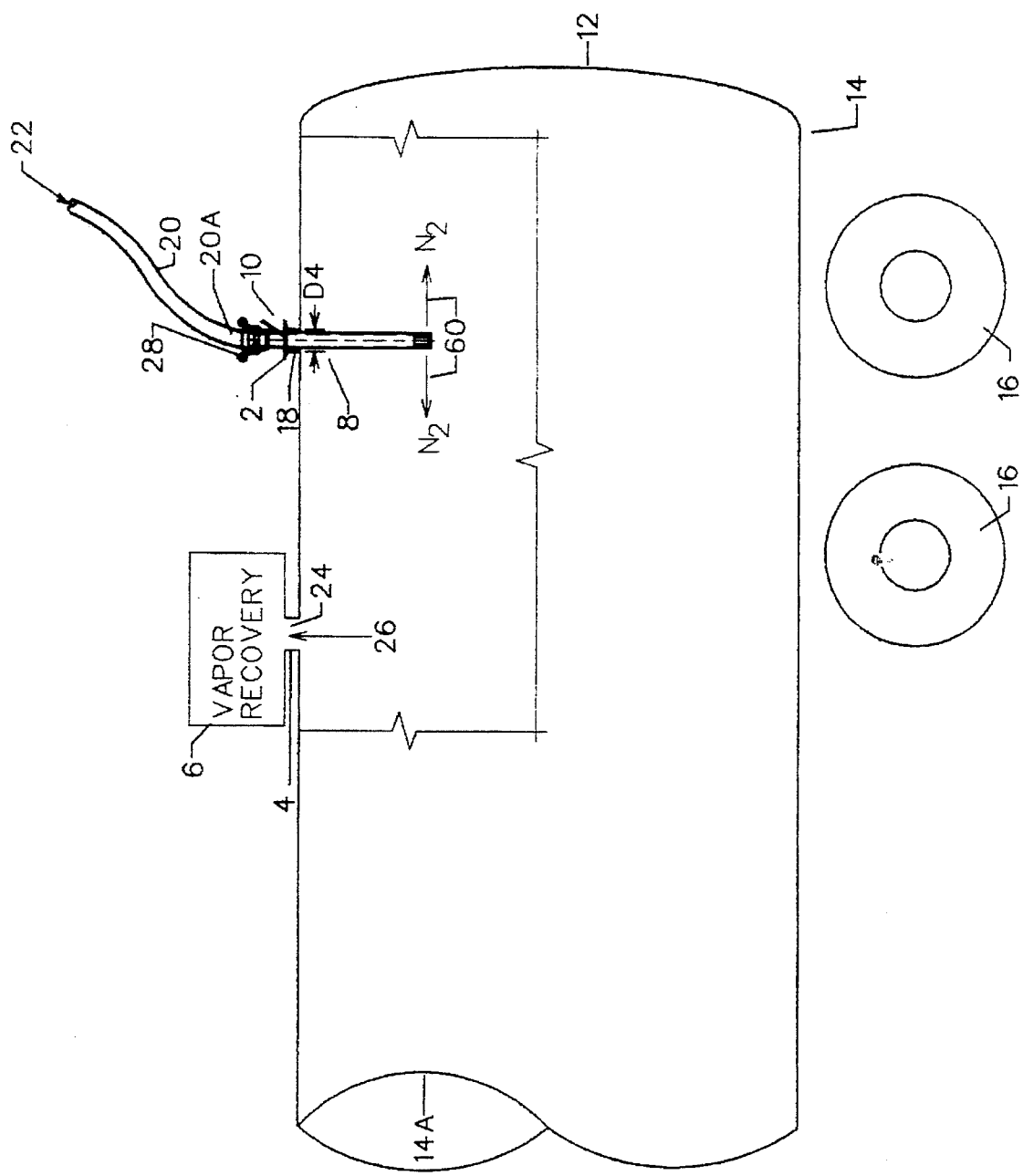
FIG. 1 is a partial schematic side elevational view of a rear end of an aluminum tank trailer for use in transport of flammable liquids such as gasoline carrying a weighted nitrogen distribution nozzle forming a preferred embodiment of the invention.

Referring to the drawings, a preferred embodiment of a weighted nitrogen distribution nozzle, which is gravity mounted to an inlet aperture or opening within the top of a trailer indicated generally at 12 and constitutes the movable member of a pressure relief valve 8 when the tank 12 is purged of air through a vapor recovery system or unit 6, which is mounted to the tank 12 in the illustrated embodiment at the top and in fluid communication with the tank interior 14A via a vapor recovery port or nipple 4. To one side of the vapor recovery unit 6, the pressure relief valve 8 utilizes a nipple 18 which is sealably coupled to the top of the tank 12 and whose bore forms an aperture 2, with the nipple 18 constituting the fixed component of the pressure relief valve 8 as will be described in detail hereinafter.

Due to the flammable nature of liquids typically carried by the trailer 12, it is necessary to purge oxygen from the interior 14A of the trailer tank 14. Such is achieved by flowing an inert gas such as nitrogen ($N_2$) at a given flow rate, as for instance 600 SCFM in the instant embodiment at a pressure above atmospheric such as 17 psig through a hose or other conduit 20. A hose end 20A remote from the source 22 is coupled via a quick disconnect female coupler 28 to the upper end 30A of the weighted nitrogen distribution nozzle 10. The lower end 30B of the weighted nitrogen distribution nozzle projects downwardly into the interior 14A of tank 14 and carries a plurality of diametrically opposite circumferentially spaced diffusion openings or slots 48 within the side of the nozzle. To purge the tank, it is necessary that the inert gas, preferably nitrogen, be slightly above atmospheric pressure within the tank. The invention is particularly applicable to trailer transport tanks manufactured of aluminum such as aluminum trailers designated as MC306 trailers and the like, which are only rated for 3 psi gas pressurization. As such, the nozzle 10 provides a reliable pressure relief valve for such aluminum trailers during purging with an inert gas such as nitrogen. While most trailers are equipped with a vapor recovery system or unit such as unit 6, which normally relieves pressure, the vapor recovery system or unit 6 often fails. The aluminum tank 14 of trailer 12 is mounted on wheels 16, shown schematically, for transport by a tractor (not shown) after loading at a loading station constituting a source 22 and which includes the hose or like conduit 20 terminating in the quick disconnect female coupler 28. In the embodiment of the invention, the nipple 18 defining an inlet opening or aperture to the interior of the tank 14 is a three inch diameter nipple, i.e., one having a nominal three inch internal diameter.

Figure 3:
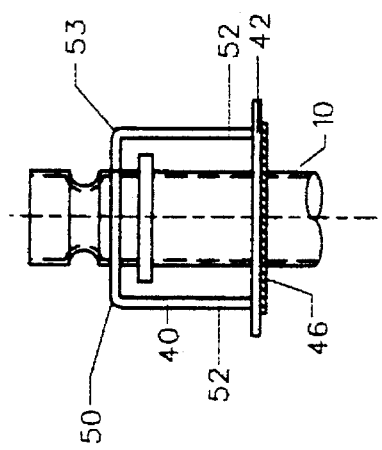
FIG. 3 is a front elevational view of the upper end of the weighted nitrogen distribution nozzle of FIG. 1.
Figure 2:
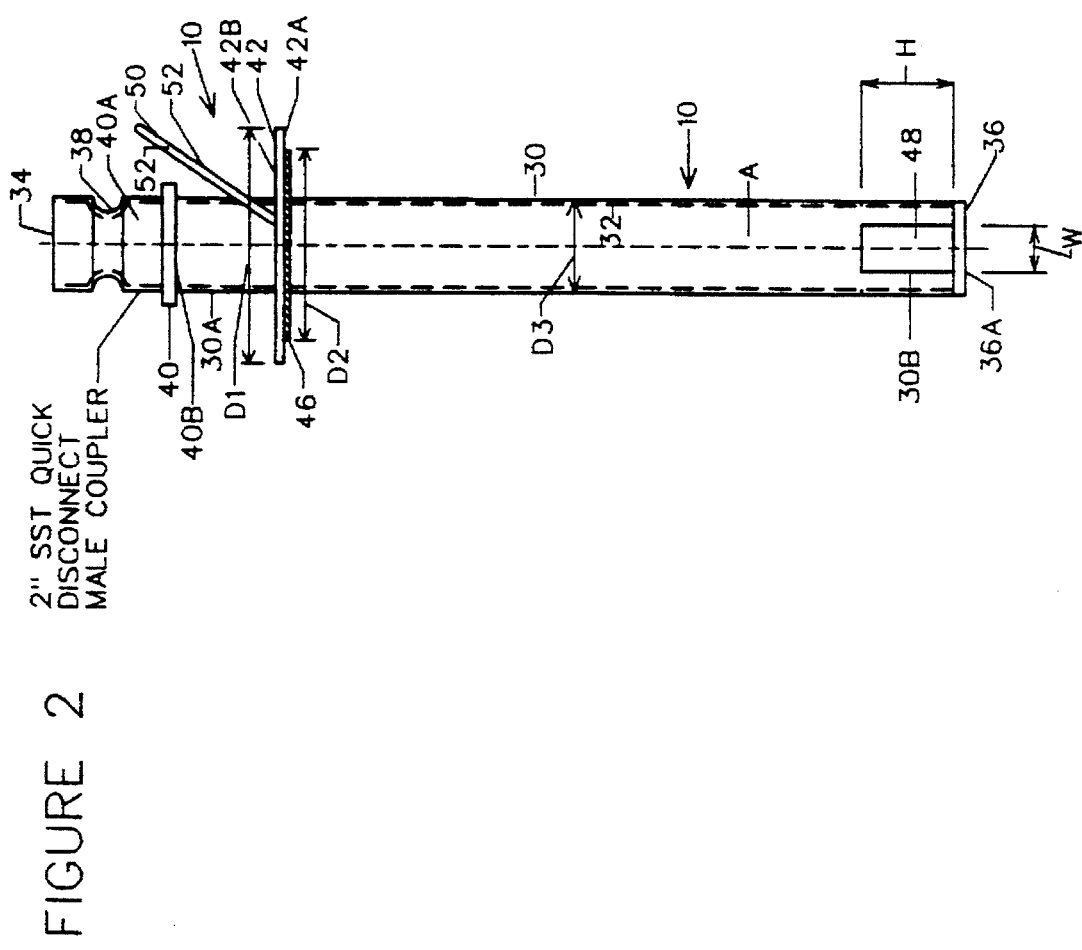
FIG. 2 is an enlarged side elevational view of the weighted nitrogen distribution nozzle of FIG. 1.

Turning to FIG. 2, the weighted nitrogen distribution nozzle 10 is formed principally of a two inch diameter schedule 10 stainless steel tube having a bore 32 slightly less than the two inch outside diameter d3 of the tube. The first, upper end 30A of tube 30 terminates in a two inch SST quick disconnect male coupler 40 having an internal bore 40A corresponding to and acting as an extension of the tube bore 32. The open end 34 of the male disconnect coupler 40 opens to the interior of the hose 20 leading to the nitrogen source 22 via quick disconnect female coupler 28. A sealed snap fit is effected between the quick disconnect female coupler 28, which receives the quick disconnect male coupler 40, with an end face of the quick disconnect female coupler 28 remote from the hose 20, abutting a radial flange 40B of the male disconnect coupler 40. The male disconnect coupler 40 is shown in FIGS. 2 and 3 as having an annular semi circular cross section groove or recess 38 effected by deforming the tubular body of the male disconnect coupler inwardly that circumferential recess or groove. A member or members of the quick disconnect female coupler 28 physically lock the couplers 28 and 40 together. Such coupler system employing the male and female components 40, 28 is commercially available under the trade name Kamlock® coupling, MIL-C-27487.

The elongated, relatively thin tube 30 is closed off at an opposite lower end 30B by a thin metal disk 36, whose outside diameter corresponds to that of the thin tube 30. The metal disk 36 may be welded or otherwise sealably coupled adjacent its periphery to tube 30.

In the preferred embodiment of the invention, the tube 30 with its quick disconnect male coupler 40 is approximately two feet in length, and the tube and the disk 36 may be formed of stainless steel. For uniformly distributing the inert gas to the interior 14A of a tank such as tank 14, the lower end 30B of the tube is provided with four circumferentially spaced distribution ports or diffusion slots 48, which are of rectangular configuration, having a width W which is one half the vertical height or length H. In the illustrated embodiment, the distribution ports or diffusion slots 48 are two inches in height and one inch in width. The disk 36 may be ¼ inch in thickness.

The combined inert gas distribution nozzle and pressure relief valve 10 is purposely gravity mounted, by inserting the lower end 30B of the tube 30 into the fuel supply nipple 18 to the extent permitted by a radially enlarged collar 42 formed by an apertured disk, whose outside diameter is in excess of the diameter of the nipple 18. In the illustrated embodiment, the diameter of the collar 42 is 5-½ inches, and the collar is ³⁄₁₆ inch thickness and is preferably formed of stainless steel. The apertured disk 42 may be welded or otherwise fixed to the tube perpendicular to the tube axis A and at a given position beneath the quick disconnect coupler 40. A ⅛ inch thick rubber gasket 46 is applied to the bottom surface 42A facing away from the quick disconnect coupler. The diameter d2 of the annular rubber gasket 46 is in excess of the diameter d4 of the three inch diameter nipple 18. In the illustrated embodiment, the diameter d2 of the rubber gasket is less than the diameter d1 of the metal collar 42.

To facilitate manual or automated insertion and retraction of the weighted nitrogen distribution nozzle 10 within the fuel inlet nipple 18, the nozzle 10 is provided with an inverted U-shaped handle indicated generally at 50 preferably formed of a stainless steel rod or like metal, and bent into U-shaped form to provide a pair of parallel legs 52 integral with and extending from a transverse gripping portion 54. The free ends of the legs 52 are welded to the upper face 42B of the metal collar 42, with those ends bevelled such that the handle 50 extends obliquely upwardly and outwardly of the collar 42, with a horizontal gripping portion 54 of the handle spaced from the quick disconnect male coupler 40.

Once the hose 20 via its quick disconnect female coupler 28 is coupled to the nozzle 10 via the male coupler 40, there is no need to connect or disconnect those components. As such, at the inert gas tank purging station, the handle 50 may be used as a support by placing the handle 50 onto a holster, hook or like member fixedly mounted to a stationary component of the inert gas purging station, after the nozzle 10 is removed from the fuel inlet nipple 18.

For safety purposes, particularly where the flammable liquid carried by the trailer transport tank 14 is in danger of static electricity buildup, it is necessary to purge the oxygen within the unfilled tank 14 to lower that oxygen content to less than 5%. In operation, the flow of the inert gas such as nitrogen ($N_2$) as indicated by the opposite direction arrows 60, both fore and aft of the tank and laterally to opposite sides from the slots 48 within the lower end 30B of the nozzle 10 is effected without any adverse gas reaction force on the tube 30 or the disk 36 closing off the lower end 30B of the nozzle. As the pressure rises within the interior 14A of the tank 14 during purging, the inert gas pressure acts on the exposed lower face 36A of the closure disk 36 and on the exposed bottom surface of the rubber gasket 46 and through the collar 42. A lifting force is developed, which is a multiple of the surface area times the gas pressure within the tank 14, tending to lift the nozzle 10 axially along its axis A out of the fuel inlet nipple 18. Such force is resisted by the weight of the nitrogen distribution nozzle 10. The overall length of the distribution nozzle is set, along with the selection of the material making up the components of nozzle 10 so as to effect an axial displacement of the weighted nitrogen distribution nozzle to the extent of lifting the rubber gasket off the upper edge of the fuel inlet nipple 18 when the inert gas pressure reaches its maximum allowable value.

In the illustrated embodiment, the weight or mass of the nozzle 10 is set at approximately 11 pounds, which corresponds to a maximum allowable pressure of 1.5 psig for the N inert gas functioning to force the oxygen (air) to pass through nipple 4 and into the vapor recovery unit or system 6, FIG. 1. The lifting of the weighted nitrogen distribution nozzle within the inlet nipple 18 results in the rubber gasket 46 unsealing from the upper edge of the nipple 18. Since the diameter d3 of the tube 30 is 2 inches, and the nipple 18 is 3 inches, a substantial annular space between the outer periphery of the tube 30 and the inner periphery of the nipple, forms a passage for the escape of the inert gas, such as nitrogen $N_2$ or the like. In fact, the purged gas, in escaping between the nipple 18 and the tube 30, causes a whistling sound, signalling the tank interior reaching the maximum inert gas pressure allowable of approximately 1.5 psig. Such pressure relief valve action ensures the integrity of the aluminum tank 14 and prevents damage to destruction of the same during inert gas purging of the interior 14A of such tank. By suitably matching the diameter and specific gravity content of the components of the weighted nitrogen distribution nozzle, inert gas such as nitrogen $N_2$ may be introduced into aluminum tank trailers at rates of 125 SCFM (standard cubic feet per minute) or more without overpressurizing the tank by use of a weighted fitting nozzle and gas diffuser, which is set to relieve at approximately ½ of the rated tank gas storage pressure.

Although the invention has been described in terms of a specific embodiment, it should be apparent that modifications may be made to the combined weighted nitrogen distribution nozzle and pressure relief valve without a departure from the invention, and it is intended by the appendant claims to cover all such modifications which generally fall within a broad interpretation of the scope of the language set forth therein.

What is claimed is:

1. A combined gravity maintained weighted inert gas distribution nozzle and pressure relief valve for limiting the purging gas pressurization of a fuel tank provided with an upwardly open fuel inlet aperture of a first diameter comprising:

a thin elongated metal tube of a second diameter less than said first diameter having a tube axis and having a first open end for coupling to a source of an inert purge gas at a pressure above atmospheric for flow through said metal tube first end, said tube having a second, closed opposite end for passage through said tank fuel inlet aperture and positioning interiorly of the fuel tank, diametrically opposed nozzle purge gas diffuser openings within said second end of said tube opening to the tank interior for inert gas pressurization of the tank, a collar carried by said tube extending radially outwardly therefrom at a position intermediate of said first and second ends of said tube of a diameter in excess of a diameter of said fuel aperture for sealing off said aperture and for gravity supporting said thin elongated metal tube on said tank with said second end projecting internally of said tank, and wherein the mass of the tube and the size of the same is such that overpressurization of the tank during purging by said inert gas is prevented by said purging gas upon reaching a predetermined gas pressure lower than the rated gas storage pressure for the tank acting directly on the bottom of said collar to raise the tube, to unseat the collar from said aperture and, to break the seal between the collar and the fuel inlet aperture, thereby functioning as a pressure relief valve.

2. The combined distribution nozzle and pressure relief valve as claimed in claim 1, wherein said collar includes a sealing gasket on a face thereof overlying said tank aperture for direct contact therewith.

3. The combined distribution nozzle and pressure relief valve as claimed in claim 1, wherein said purge gas diffusions openings comprise a plurality of circumferentially spaced elongated slots within said tube at said closed, second end extending from the closed end in the direction of said collar.

4. The combined distribution nozzle and pressure relief valve as claimed in claim 3, wherein said slots are elongated in the direction of the tube axis.

5. The combined distribution nozzle and pressure relief valve as claimed in claim 1, further comprising an inverted U-shaped metal handle fixed to said collar and extending obliquely outwardly of said collar in the direction of said first open end of said tube.

6. The combined distribution nozzle and pressure relief valve as claimed in claim 5, wherein said thin elongated metal tube, said collar and said handle are formed of stainless steel.

\* \* \* \* \*